United States Patent
Verma et al.

(10) Patent No.: US 11,040,308 B2
(45) Date of Patent: Jun. 22, 2021

(54) SYSTEMS AND METHODS FOR PURGING REDUCTANT FROM A REDUCTANT INJECTOR

(71) Applicant: CUMMINS EMISSION SOLUTIONS INC., Columbus, IN (US)

(72) Inventors: Neha Verma, Pune (IN); Nicholas Blodgett, Columbus, IN (US); Colin L. Norris, Columbus, IN (US); Taren DeHart, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 154 days.

(21) Appl. No.: 16/028,081

(22) Filed: Jul. 5, 2018

(65) Prior Publication Data
US 2020/0009505 A1  Jan. 9, 2020

(51) Int. Cl.
*B01D 53/90* (2006.01)
*F01N 3/32* (2006.01)
*F01N 3/20* (2006.01)

(52) U.S. Cl.
CPC ............. *B01D 53/90* (2013.01); *F01N 3/208* (2013.01); *F01N 3/32* (2013.01);
(Continued)

(58) Field of Classification Search
CPC ...... B01D 2251/2067; B01D 2257/404; B01D 53/90; F01N 2610/02; F01N 2610/03;
(Continued)

(56) References Cited

U.S. PATENT DOCUMENTS

| 7,937,932 B2 | 5/2011 | Hager et al. |
| 8,888,017 B2 | 11/2014 | Ponnathpur et al. |

(Continued)

FOREIGN PATENT DOCUMENTS

DE   10 2005 002 318   7/2006

OTHER PUBLICATIONS

International Search Report and Written Opinion dated Nov. 6, 2019 in PCT/US2019/040273.
(Continued)

*Primary Examiner* — Anthony Ayala Delgado
(74) *Attorney, Agent, or Firm* — Foley & Lardner LLP

(57) ABSTRACT

A reductant insertion system for inserting reductant into an aftertreatment system via a reductant injector comprises a reductant insertion assembly comprising a pump operatively coupled to the reductant injector via a reductant delivery line. A compressed gas source is operatively coupled to the reductant injector and provides a compressed gas to the reductant injector for gas assisted delivery of the reductant. A controller is operatively coupled to the compressed gas source and the reductant insertion assembly and configured to determine whether there is a reductant demand for the reductant. In response to there being no reductant demand, the controller stops the pump and activates the compressed gas source for a predetermined time so as to provide compressed gas to the reductant injector at a pressure sufficient to force reductant contained in the reductant injector upstream towards the reductant insertion assembly via the reductant delivery line while the pump is stopped.

20 Claims, 7 Drawing Sheets

(52) U.S. Cl.
CPC ............... *B01D 2251/2067* (2013.01); *B01D 2257/404* (2013.01); *F01N 2610/02* (2013.01); *F01N 2610/03* (2013.01); *F01N 2610/085* (2013.01); *F01N 2610/144* (2013.01); *F01N 2610/1473* (2013.01); *F01N 2610/1493* (2013.01); *F01N 2900/0422* (2013.01); *F01N 2900/1808* (2013.01)

(58) Field of Classification Search
CPC ......... F01N 2610/085; F01N 2610/144; F01N 2610/1473; F01N 2610/1493; F01N 2900/0422; F01N 2900/1808; F01N 3/208; F01N 3/32
See application file for complete search history.

(56) References Cited

U.S. PATENT DOCUMENTS

| | | |
|---|---|---|
| 2006/0042234 A1 | 3/2006 | Song et al. |
| 2010/0115932 A1 | 5/2010 | Kassel et al. |
| 2010/0122521 A1 | 5/2010 | Sun et al. |
| 2011/0146247 A1 | 6/2011 | Nalla et al. |
| 2012/0036835 A1 | 2/2012 | Huthwohl |
| 2013/0263580 A1 | 10/2013 | Habumuremyi et al. |
| 2015/0047326 A1 | 2/2015 | Gardner et al. |
| 2017/0328253 A1* | 11/2017 | Kizawa ................. F01N 11/005 |
| 2019/0032532 A1* | 1/2019 | Sykes ..................... F01N 3/208 |
| 2019/0170035 A1* | 6/2019 | Parmar .................... F01N 9/00 |

OTHER PUBLICATIONS

Examination Report in United Kingdom Appl. No. GB2020567.0, dated Jan. 26, 2021.

* cited by examiner

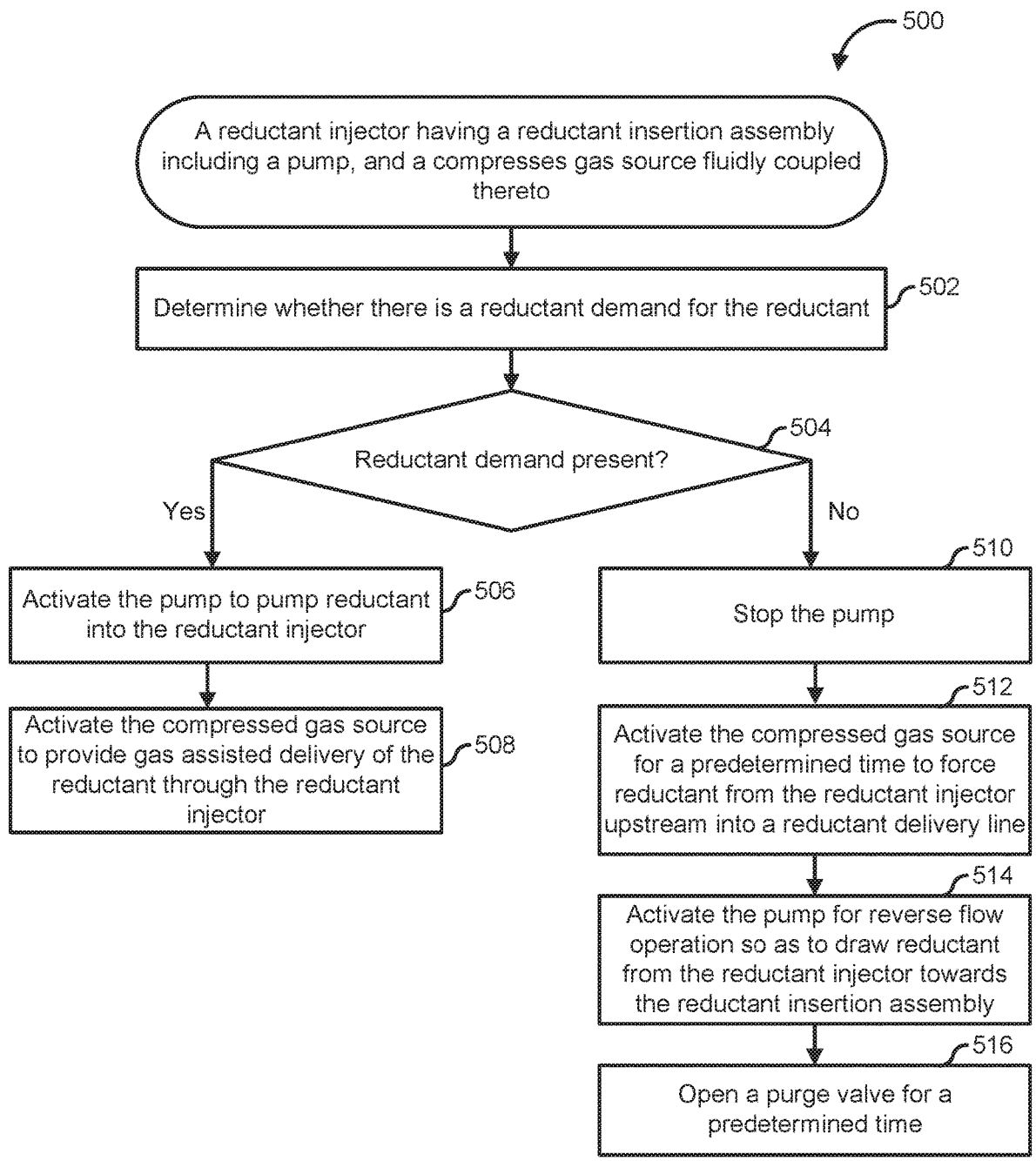

SYSTEMS AND METHODS FOR PURGING REDUCTANT FROM A REDUCTANT INJECTOR

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems include any of several different components to reduce the levels of harmful exhaust emissions present in the exhaust gas. For example, certain exhaust gas aftertreatment systems for diesel-powered IC engines include a selective catalytic reduction (SCR) system including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant, (e.g., a diesel exhaust fluid such as urea) is injected into the SCR system to provide a source of ammonia, and mixed with the exhaust gas to partially reduce the NOx gases. The reduction byproducts of the exhaust gas are then communicated to the catalyst included in the SCR system to decompose substantially all of the NOx gases into relatively harmless byproducts which are expelled out of the aftertreatment system.

A reductant is generally inserted into the SCR system as the source of ammonia to facilitate the reduction of constituents such as NOx gases of the exhaust gas (e.g., a diesel exhaust gas) by the catalyst included in the SCR system. Reductant insertion assemblies which can include pumps, valves, fluid communication lines, nozzles, pressure relief valve, bypass valves, reductant injectors and/or other fluid communication equipment are often used for controlled insertion of the reductant into the aftertreatment system, for example the SCR system of the aftertreatment system.

During a period when a reductant is not being inserted into the SCR system, for example, when a reductant demand is not present or the equipment (e.g., a vehicle) including the aftertreatment system is turned OFF, some reductant may remain in the reductant injector in a flow path of the exhaust gas. Low atmospheric temperature (e.g., temperatures below −11 degrees Celsius) may lead to freezing and expansion of the remaining reductant in the reductant injector and/or reductant delivery line. On the other hand, exposure of the remaining reductant to the high temperature exhaust gas may cause thermal degradation, crystallization and/or cracking of the reductant in the reductant injector. Freezing and/or thermal degradation may lead to partial or full blockage of the reductant delivery line and/or reductant injector, as well as mechanical damage, therefore increasing maintenance costs.

SUMMARY

Embodiments described herein relate generally to systems and methods for purging a reductant injector of a reductant, and in particular, to purging reductant injectors when a reductant demand is not present using at least one of: providing a compressed gas provided to the reductant injector to force the reductant out of the reductant injector and at least part way into a reductant delivery line, reversing a flow direction of a pump of a reductant insertion assembly, and/or providing for gravity assisted drainage of reductant from the reductant injector.

In a first set of embodiments, a reductant insertion system for inserting reductant into an aftertreatment system via a reductant injector comprises a reductant insertion assembly comprising a pump operatively coupled to the reductant injector via a reductant delivery line and configured to pump the reductant to the reductant injector. A compressed gas source is operatively coupled to the reductant injector and configured to provide a compressed gas to the reductant injector for gas assisted delivery of the reductant through the reductant injector. A controller is operatively coupled to the compressed gas source and the reductant insertion assembly. The controller is configured to determine whether there is a reductant demand for the reductant. In response to determining that there is no reductant demand, the controller is configured to stop the pump, and activate the compressed gas source for a predetermined time so as to provide compressed gas to the reductant injector at a pressure sufficient to force reductant contained in the reductant injector upstream towards the reductant insertion assembly via the reductant delivery line while the pump is stopped.

In another set of embodiments, a reductant insertion system for inserting a reductant into an aftertreatment system via a reductant injector comprises a reductant insertion assembly operatively coupled to the reductant injector via a reductant delivery line. The reductant insertion assembly comprises a pump. A controller is operatively coupled to the reductant insertion assembly. The controller is configured to determine whether there is a reductant demand for the reductant. In response to the determining that there is no reductant demand, the controller is configured to activate the pump for reverse flow operation so as to draw any reductant contained in the reductant injector upstream towards the reductant insertion assembly via the reductant delivery line.

In still another set of embodiments, a method for purging a reductant from a reductant injector, having a reductant insertion assembly comprising a pump and operatively coupled to the reductant injector via a reductant delivery line, and a compressed gas source operatively coupled to the reductant injector, comprises determining whether there is a reductant demand for the reductant. In response to the reductant demand being present, the pump is activated so as to pump the reductant into the reductant injector and the compressed gas source is activated so as to provide gas assisted delivery of the reductant through the reductant injector. In response to the determining that there is no reductant demand, the pump is stopped. Furthermore, the compressed gas source is activated for a predetermined time so as to provide the compressed gas to the reductant injector at a pressure sufficient to force reductant contained in the reductant injector upstream towards the reductant insertion assembly via the reductant delivery line while the pump is stopped.

In yet another set of embodiments, a method for purging a reductant from a reductant injector having a reductant insertion assembly comprising a pump and operatively coupled to the reductant injector via a reductant delivery line, and a compressed gas source operatively coupled to the reductant injector, comprises determining whether there is a reductant demand for the reductant. In response to the reductant demand being present, the pump is activated for forward flow operation so as to pump the reductant into the reductant injector via the reductant delivery line, and the compressed gas source is activated so as to provide gas assisted delivery of the reductant through the reductant injector. In response to determining that there is no reductant demand, the pump is activated for reverse flow operation so as to draw reductant contained in the reductant injector upstream towards the reductant insertion assembly via the reductant delivery line.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 5 is schematic flow diagram of a method for purging a reductant injector of a reductant, according to an embodiment.

Figure 1:
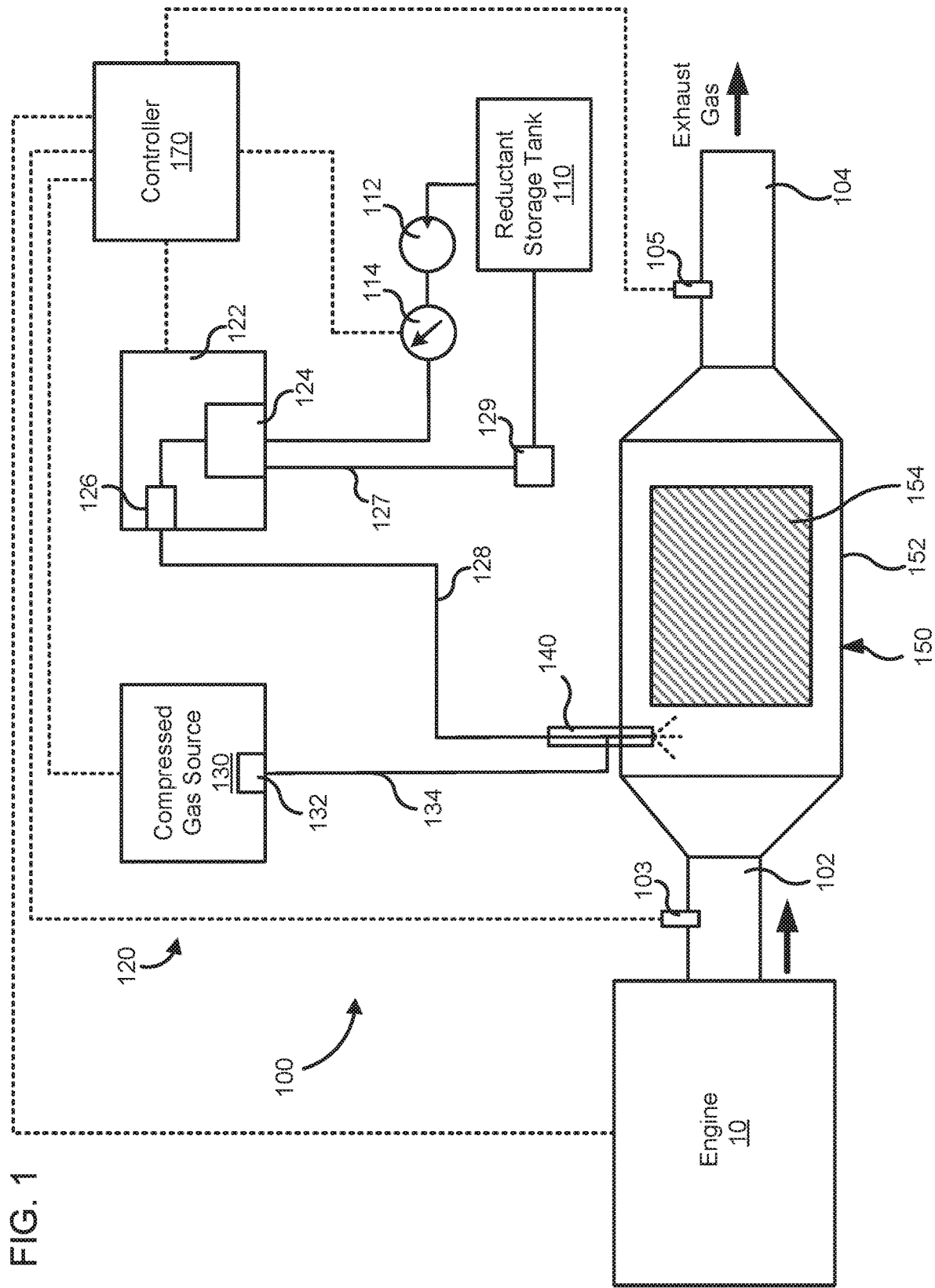
FIG. 1 is a schematic block diagram of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for providing compressed gas to or purging a reductant injector of a reductant and in particular, to purging reductant injectors when a reductant demand is not present using at least one of: providing a compressed gas provided to the reductant injector to force the reductant out of the reductant injector and at least part way into a reductant delivery line, reversing a flow direction of a pump of a reductant insertion assembly, and/or providing for gravity assisted drainage of reductant from the reductant injector.

Some aftertreatment systems are operatively coupled to large engines, for example HHP engines (e.g., having a capacity in the range of 19 liters to 120 liters or even higher) which generate a large amount of exhaust gas. Such aftertreatment systems use a large amount of reductant for reducing constituents of the exhaust gas. The reductant is generally inserted into the aftertreatment system, for example, an SCR system of the aftertreatment system using one or more reductant injectors which may be positioned in a flow path of the exhaust gas. Compressed gas, for example, air or recirculated exhaust gas may also be provided to the reductant injector for gas assisted delivery of the reductant into the SCR system.

During a period when a reductant is not being inserted into the SCR system, for example, when a reductant demand is not present or an equipment (e.g., a vehicle) including the aftertreatment system is turned OFF, some reductant may remain in the reductant injector. Low atmospheric temperature (e.g., temperatures below −11 degrees Celsius) may lead to freezing and expansion of the remaining reductant in a reductant injector and reductant delivery line. On the other hand, exposure of the remaining reductant to the high temperature exhaust gas may cause thermal degradation, crystallization and/or cracking of the reductant in the reductant injector. Freezing and thermal degradation may lead to partial or full blockade of the reductant delivery line and/or reductant injector, as well as mechanical damage increasing maintenance costs.

Some conventional reductant insertion assemblies include a separate bypass valve for purging the reductant injector and reductant delivery lines of the reductant. Such bypass valves purge the reductant and reductant delivery lines to atmospheric pressure and therefore, have to be primed for a subsequent reductant insertion event, which may lead to priming issues. Bypass valves are, also prone to failure and lead to high maintenance costs. Furthermore, a separate bypass system adds additional components to the reductant insertion assembly and may lead to a significant increasing in manufacturing cost.

Various embodiments of the systems and methods described herein for may provide benefits including, for example: (1) purging of reductant remaining in a reductant injector in the absence of a reductant demand, therefore preventing freezing or thermal degradation of the reductant in the reductant injector; (2) enabling reductant to be forced upstream only part of a length of a reductant delivery line so as to prevent purging of the reductant insertion assembly and avoiding priming issues as well as preventing hot exhaust gas from entering the reductant insertion assembly; and (3) reducing manufacturing cost by eliminating use of a bypass valve or other auxiliary components for purging the reductant from the reductant injector.

FIG. 1 is a schematic illustration of an aftertreatment system 100, according to an embodiment. The aftertreatment system 100 is configured to receive an exhaust gas (e.g., a diesel exhaust gas) from an engine 10 and the reduce constituents of the exhaust gas such as, for example, NOx gases, CO, etc. The aftertreatment system 100 includes a reductant storage tank 110, a reductant insertion system 120 and a SCR system 150.

The engine 10 may include an IC engine, for example a diesel engine, a gasoline engine, a natural gas engine, a biodiesel engine, a dual fuel engine, an alcohol engine, an E85 or any other suitable internal combustion engine. In some embodiments, the engine 10 may include a HHP engine, for example having a volumetric capacity in the range of 19 liters to 120 liters or even higher, and a rated power of greater than 500 HP.

The reductant storage tank 110 contains an exhaust reductant formulated to facilitate reduction of the constituents of the exhaust gas (e.g., NOx gases) by a catalyst 154 included in the SCR system 150. In embodiments in which the exhaust gas is a diesel exhaust gas, the exhaust reductant can include a diesel exhaust fluid (DEF) which provides a source of ammonia. Suitable DEFs can include urea, aqueous solution of urea or any other DEF (e.g., the DEF available under the tradename ADBLUE®). In particular embodiments, the reductant includes an aqueous urea solution containing 32.5% urea and 67.5% de-ionized water. In other embodiments, the reductant includes aqueous urea solution containing 40% urea and 60% de-ionized water, or may include any other concertation ratio of urea to deionized water.

While systems and methods are described herein are explained as a reductant insertion system for inserting a reductant into an aftertreatment system, it should be appreciated that the concepts described herein are equally applicable to any other fluid insertion system for inserting a fluid into a system. Such systems may include, for example, a hydrocarbon insertion system for inserting hydrocarbons (e.g., gasoline, diesel, biodiesel, natural gas, ethanol or any other suitable fuel) into an aftertreatment system, for example, for regenerating components of the aftertreatment system (e.g., an oxidation catalyst included in the aftertreatment system).

The SCR system 150 is configured to receive and treat the exhaust gas (e.g., a diesel exhaust gas) flowing through the SCR system 150. The SCR system 150 is operatively coupled to the reductant storage tank 110 so as to receive the reductant therefrom via the reductant insertion system 120, as described herein. The SCR system 150 includes a housing 152 defining an inlet 102 for receiving the exhaust gas from the engine 10, and an outlet 104 for expelling treated exhaust gas. While shown as including a single inlet 102, in various embodiments, the SCR system 150 may include a plurality of inlets for receiving exhaust gas from the engine 10 (e.g., from an exhaust manifold thereof). In other embodiments, the aftertreatment system 100 may include a plurality of SCR systems 150, each of the plurality of SCR systems 150 configured to receive and treat a portion of the exhaust gas produced by the engine 10. For example, each of the plurality of SCR systems 150 may be dedicated to receiving and treating exhaust gas from a subset of a plurality of engine cylinders of the engine 10.

A first sensor 103 may be positioned in the inlet 102. The first sensor 103 may include, for example a NOx sensor (e.g., a physical or virtual NOx sensor), an oxygen sensor, a particulate matter sensor, a carbon monoxide sensor, a temperature sensor, a pressure sensor, any other sensor or a combination thereof configured to measure one or more parameters of the exhaust gas. Furthermore, a second sensor 105 may be positioned in the outlet 104. The second sensor 105 may include, for example a NOx sensor, a particulate matter sensor, an ammonia oxide (AMOx) sensor, an oxygen sensor, a temperature sensor, a pressure sensor, any other sensor or a combination thereof.

The SCR system 150 includes at least one catalyst 154 positioned within an internal volume defined by the housing 152. The catalyst 154 is formulated to selectively reduce constituents of the exhaust gas, for example NOx gases included in the exhaust gas in the presence of the reductant. Any suitable catalyst 154 can be used such as, for example, platinum, palladium, rhodium, cerium, iron, manganese, copper, vanadium based catalysts (including combinations thereof).

The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials can include, for example, aluminum oxide, titanium dioxide, silicon dioxide, any other suitable washcoat material, or a combination thereof. The exhaust gas can flow over and about the catalyst 154 such that NOx gases included in the exhaust gas are further reduced to yield an exhaust gas which is substantially free of carbon monoxide and NOx gases.

The aftertreatment system 100 also includes a reductant injector 140 configured to insert the reductant into the SCR system 150. The reductant injector 140 may include, for example, a dosing lance and may be positioned in an exhaust flow path of the exhaust gas flowing through the SCR system 150, for example, positioned to insert the reductant along a centerline of the exhaust flow path. The reductant injector 140 is configured to provide gas assisted delivery of the reductant into the SCR system 150. For example, the reductant injector 140 may be configured to receive reductant from a reductant insertion assembly 122 and compressed gas (e.g., compressed air o recirculated exhaust gas) from a compressed gas source 130 included in the reductant insertion system 120, and insert a gas-reductant mixture into the SCR system 150. As shown in FIG. 1, the reductant injector 140 is positioned on the housing 152 of the SCR system 150. In other embodiments, the inlet 102 may include a decomposition chamber or tube to allow the reductant to react with the exhaust gas. In such embodiments, the reductant injector 140 maybe positioned in the inlet 102 so as to insert the reductant upstream of the SCR system 150.

Figure 3:
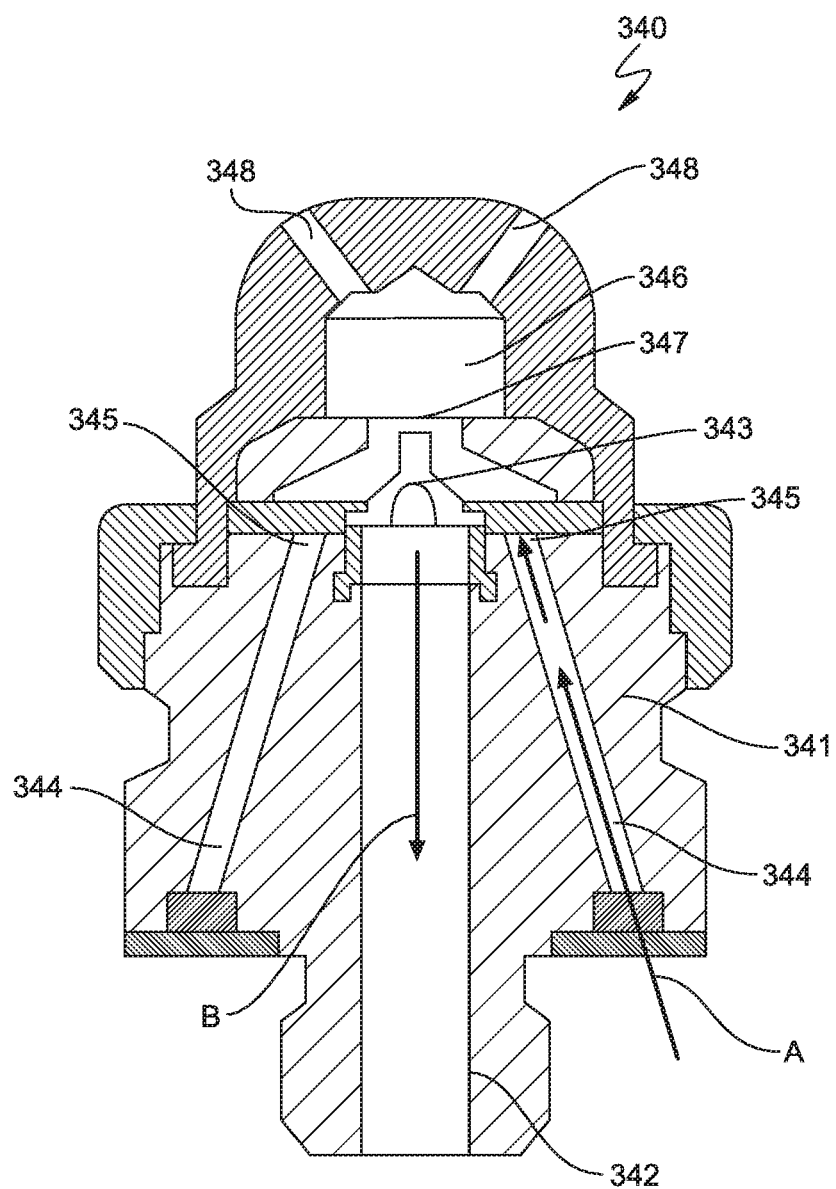
FIG. 3 is a cross-section view of reductant injector, according to an embodiment.

Any suitable reductant injector may be used as the reductant injector 140. For example, FIG. 3 is a side cross-section view of a reductant injector 340 which may be used in the aftertreatment system 100, according to an embodiment. The reductant injector 340 comprises a reductant injector housing 341 defining an axial reductant channel 342 having a reductant orifice 343 define proximate to outlets 348 of the reductant injector 340. The reductant injector housing 341 further defines one or more compressed gas channels 344 having a compressed gas orifice 345 positioned proximate to the reductant orifice 343. As shown in FIG. 3, the compressed gas channels 344 are positioned at an angle with respect to the reductant channel 342. In other embodiments, the reductant injector housing 341 may define one or more compressed gas channels 344, positioned perpendicular to, or at any other suitable angle with respect to the reductant channel 342.

The reductant injector housing 341 defines a critical orifice 347 positioned downstream of the compressed gas orifice 345 and the reductant orifice 343. The critical orifice 347 leads into a mixing chamber 346, and is configured to accelerate the flow of the reductant and compressed gas into the mixing chamber 346 so as to facilitate mixing of the reductant and compressed gas in the mixing chamber 346 and/or control a flow rate and/or pressure of the gas-reductant mixture. The outlets 348 are operatively coupled to the mixing chamber 346 and configured to insert the gas-reductant mixture into the SCR system (e.g., the SCR system 150).

Referring now to FIG. 1, the reductant insertion system 120 is operatively coupled to the reductant storage tank 110 and the SCR system 150 and configured to provide reductant and compressed gas to the reductant injector 140. The reductant insertion system 120 includes the reductant insertion assembly 122. The reductant insertion assembly 122 comprises a pump 124. In some embodiments, an upstream pump 112 is positioned downstream of the reductant storage tank 110 and upstream of the reductant insertion assembly 122. The upstream pump 112 may include, for example a lift pump (e.g., a diaphragm pump or a piezoelectric pump) operatively coupled to the reductant storage tank 110 and configured to pump the reductant from the reductant storage tank 110 to the reductant insertion assembly 122 at a predetermined upstream pressure and/or flow rate. An upstream pressure sensor 114 may be positioned upstream of the reductant insertion assembly 122 and downstream of the upstream pump 112. The upstream pressure sensor 114 may be configured to determine a reductant pressure upstream of the reductant insertion assembly 122 and generate an upstream pressure signal indicative of the reductant pressure upstream of the reductant insertion assembly 122. The upstream pump 112 may be configured to adjust a pumping pressure thereof so as to provide the reductant to the reductant insertion assembly 122 at the predetermined upstream pressure and/or flow rate (e.g., a rated inlet pressure and/or flow rate of the reductant insertion assembly 122).

The pump 124 configured to receive the reductant from the reductant storage tank 110 and pressurize the reductant to an operating pressure of the pump 124. The pump 124 is configured to provide the reductant at a predetermined pressure and/or flow rate to the reductant injector 140. In various embodiments, the operating pressure may be in the range of 0.5 bar to 10 bar (e.g., 0.5 bar, 1 bar, 2 bar, 4 bar, 6 bar, 8 bar or 10 bar inclusive of all ranges and values therebetween). The pump 124 may include any suitable pump, for example a centrifugal pump, a rotary pump, vacuum pump, a plate pump, a diaphragm, a membrane pump or any other suitable pump.

In particular embodiments, the pump 124 includes a fixed displacement gear pump. An rpm or pumping speed of the pump 124 included in the reductant insertion assembly 122 may be adjustable so as to allow the pump 124 to adjust the operating pressure of the reductant provided to the reductant injector 140. In particular embodiments, the pump 124 may be structured to pump a predetermined volume of the reductant per revolution of the gear or motor of the pump 124. In some embodiments, one or more metering valves 126 may also be included in the reductant insertion assembly 122 and configured to be selectively opened (e.g., in response to a reductant demand) for providing the reductant to the reductant injector 140. One or more nozzles (e.g., the nozzles 194a/b/c/d shown in FIGS. 4A-B) may also be positioned downstream of the one or more metering valves 126 and configured to control a flow rate and/or pressure of the reductant provided to the reductant injector 140. A reductant delivery line 128 fluid couples the reductant insertion assembly 122 (e.g., the pump 124) to the reductant injector 140.

In some embodiments, the reductant insertion system 120 may also include a reductant return line 127 configured to return at least a portion of the reductant back to the reductant storage tank 110 from the reductant insertion assembly 122, for example, to prevent over pressurization of the pump 124. A purge valve 129 may be positioned in the reductant return line 127. The purge valve 129 may be configured to open in response to a reductant pressure of the reductant exceeding a predetermined pressure threshold.

The reductant insertion system 120 also comprises a compressed gas source 130 configured to provide compressed gas to the reductant injector 140 for gas assisted delivery of the reductant through the reductant injector 140. In some embodiments, the compressed gas source 130 may include an air tank configured to store compressed air, such that the compressed gas comprises compressed air. In other embodiments, the compressed gas source 130 may comprise an exhaust gas recirculation line configured to recirculate at least a portion of the exhaust gas to the reductant injector 140, such that the compressed gas comprises exhaust gas. In some embodiments, the compressed gas source 130 may also include a compressor configured to pressurize the gas (e.g., air or recirculated exhaust gas) to a predetermined gas pressure. The compressed gas source 130 may also include a gas valve 132 configured to be selectively opened so as to allow the compressed gas to be provided to the reductant injector 140 via a gas delivery line 134.

In particular embodiments, the reductant insertion system 120 also comprises a controller 170. The controller 170 is communicatively coupled to the reductant insertion assembly 122 and the compressed gas source 130. The controller 170 may be configured to determine whether there is a reductant demand for the reductant. For example, the controller 170 may also be communicatively coupled to the engine 10, the first sensor 103 and/or the second sensor 105. The controller 170 may receive signals from the engine 10 corresponding to one or more engine operating parameters (e.g., engine speed, torque, power, air-fuel ratio, exhaust flow rate, etc.), from the first sensor 103 corresponding to amount of NOx gases in the exhaust gas entering the SCR system 150, and/or from the second sensor 105 corresponding to an amount of NOX gases in the treated exhaust gas being expelled into the environment. The controller 170 may be configured to interpret one or more of these signals to determine if the reductant should be inserted into the SCR system 150 (i.e., if a reductant demand for the reductant). The controller 170 may also be configured to determine a volume, a flow rate, a pressure, an insertion timing and/or an insertion frequency of a reductant to be inserted into the SCR system 150 using one or more of the signals received from the engine 10, the first sensor 103 and/or the second sensor 105.

The controller 170 may be configured to selectively activate the reductant insertion assembly 122 (e.g., activate the pump 124 and open the metering valve 126) and the compressed gas source 130 (e.g., open the gas valve 132), for example, in response to a reductant demand being present. Activating the pump 124 causes the reductant to be pumped into the reductant injector 140. Furthermore, activating the compressed gas source 130 (e.g., opening the gas valve 132) causes the compressed gas source 130 to provide the compressed gas (e.g., compressed air or recirculated exhaust gas) to the reductant injector 140 so as to provide gas assisted delivery of the reductant through the reductant injector 140.

In some embodiments, in response to the reductant demand being not present, (e.g., when exhaust gas pressure or flow rate is low, at engine 10 startup and/or engine 10 OFF conditions) the controller 170 may be configured to stop the pump 124 and activate the compressed gas source 130 (e.g., open the gas valve 132) for a predetermined time so as to provide compressed gas to the reductant injector 140 (e.g., without the pump 124 being activated and/or with the metering valve 126 being closed). The compressed gas may force the reductant contained in the reductant injector 140 upstream towards the reductant insertion assembly 122 via the reductant delivery line 128 while the pump is stopped, therefore purging the reductant injector 140 of the reductant when there is no reductant demand. For example with reference to FIG. 3, with the pump 124 turned OFF and the metering valve 126 open, the compressed gas flowing through the gas channel 344 towards the critical orifice 347 may have sufficient pressure such that at least a portion of the compressed gas flows through the reductant orifice 343 into the reductant channel 342, as shown by the arrows A and B, so as to force the reductant upstream into the reductant delivery line 128.

In some embodiments, the compressed gas may have a pressure sufficient to force the reductant contained in the reductant injector 140 upstream into the reductant delivery line 128 such that at least a portion of a length of the reductant delivery line 128 downstream of the reductant insertion assembly 122 remains filled with the reductant. In other words, the compressed gas may force the reductant only part way through the reductant delivery line 128. This may prevent the hot exhaust gas from flowing upstream through the reductant delivery line 128 into the reductant insertion assembly 122 which may damage the components of the reductant insertion assembly 122, and also prevent priming issues by preventing the reductant delivery line 128 from being completely purged of the reductant.

In other embodiments, the compressed gas may have a pressure sufficient to force the reductant contained in the reductant injector 140 completely into the reductant insertion assembly 122 through the reductant delivery line 128 such that the reductant delivery line 128 is substantially empty of the reductant. In other embodiments, the controller 170 may be configured to also move the purge valve 129 into an open configuration so as to allow at least a portion of the reductant to be force towards the reductant storage tank 110 through the reductant return line 127. In such embodiments, the compressed gas pressure may be sufficient to force the reductant only a portion of a length of the reductant return line 127 or substantially empty the reductant return line 127.

In some embodiments, in response to the reductant demand being not present, the controller 170 may be additionally or alternatively configured to activate the pump 124 for reverse flow operation so as to draw any reductant contained in the reductant injector 140 upstream towards the reductant insertion assembly 122. For example, the pump 124 may include a fixed displacement gear pump configured for reversible flow operation, for example, forward flow operation configured to pump the reductant towards the reductant injector 140, as well as reverse flow operation configured to draw the reductant from the reductant injector 140 towards the pump 124. A pulse width modulated (PWM) signal may be used to control the operation of the pump 124.

In some embodiments, the controller 170 may be configured to activate the pump 124 for a first predetermined time such that at least a portion of a length of the reductant delivery line 128 downstream of the reductant insertion assembly 122 remains filled with the reductant. For example, the pump 124 may be activated for a first predetermined number of revolutions or a fixed displacement in the reverse flow operation during the first predetermined time. Reverse flow operation exerts a negative pressure in the reductant delivery line 128 causing the reductant contained in the reductant injector 140 to be drawn under the negative pressure towards the pump 124. The first predetermined number of revolutions, fixed displacement, or operation for the first predetermined time may be configured to draw the reductant a predetermined distance into the reductant delivery line 128. When a reductant demand is present, the pump 124 may be operated in the forward flow operation for the first predetermined number of revolutions, the fixed displacement or for the predetermined time for priming the reductant injector 140.

In some embodiments, the controller 170 may be configured to activate the pump 124 for a second predetermined time such that substantially all of the reductant is drawn from the reductant injector 140 and the reductant delivery line 128 into the pump 124, such that the reductant delivery line 128 is substantially empty of the reductant. The second predetermined time, may be configured to operate the pump 124 in reverse flow operation for a second predetermined number of revolutions or displacement so as to draw the reductant contained in the reductant injector 140 and the reductant delivery line 128 into the pump 124 such that the reductant delivery line 128 is substantially empty of the reductant.

In other embodiments, the controller 170 may be configured to also move the purge valve 129 into an open configuration so as to allow at least a portion of the reductant contained with the reductant return line 127 to also be drawn towards the pump 124 and back towards the reductant storage tank 110. In such embodiments, the pump 124 may be operated any length of time in reverse flow mode (e.g., a predetermined number of revolutions or a fixed displacement) so as to withdraw the reductant from the reductant return line 127 such that a portion of the length of the reductant return line 127 contains reductant, or the reductant return line 127 is substantially empty of the reductant.

In some embodiments, additionally or alternatively, at least a portion of the reductant insertion assembly 122 may be positioned at a lower elevation relative to the reductant injector 140, for example mounted below the reductant injector 140. This may cause the reductant contained in the reductant injector 140 to flow upstream towards the reductant insertion assembly 122 under the influence of gravity when the reductant demand is not present, thereby purging the reductant injector 140.

Figure 2:
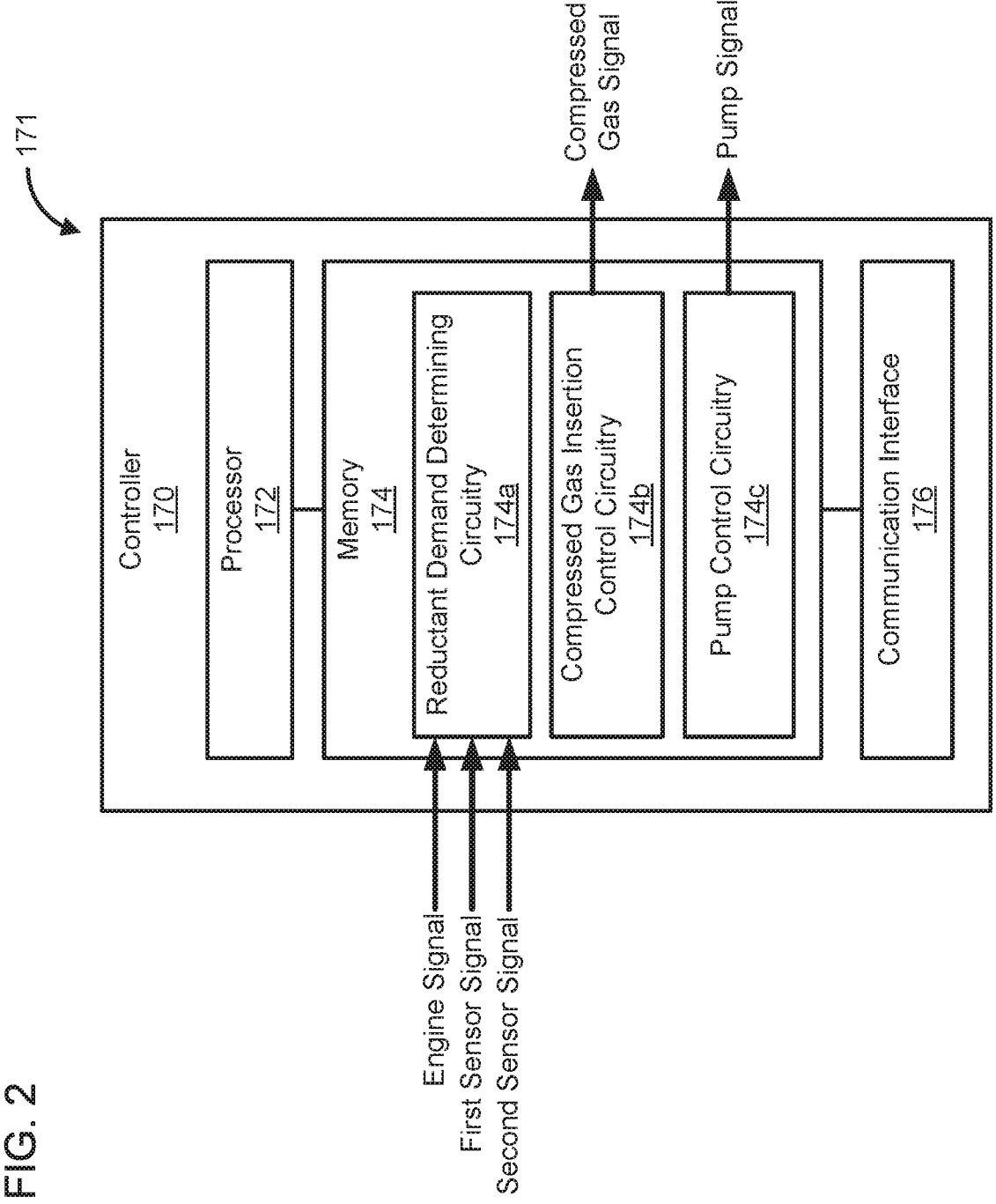
FIG. 2 is schematic block diagram of a control circuitry that can include the controller included in the aftertreatment system of FIG. 1, according to an embodiment.

In particular embodiments, the controller 170 may be included in a control circuitry. For example, FIG. 2 is a schematic block diagram of a control circuitry 171 that comprises the controller 170, according to an embodiment. The controller 170 comprises a processor 172, a memory 174, or any other computer readable medium, and a communication interface 176. Furthermore, the controller 170 includes a reductant demand determination circuitry 174a, a compressed gas insertion control circuitry 174b and a pump control circuitry 174c. It should be understood that the controller 170 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the reductant demand determination circuitry 174a, the compressed gas insertion control circuitry 174b and the pump control circuitry 174c are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the reductant demand determination circuitry 174a, the compressed gas insertion control circuitry 174b and the pump control circuitry 174c are embodied as hardware units, such as electronic control units. As such, the reductant demand determination circuitry 174a, the compressed gas insertion control circuitry 174b and the pump control circuitry 174c may be embodied as one or more circuitry components including, but not limited to, processing circuitry, network interfaces, peripheral devices, input devices, output devices, sensors, etc.

In some embodiments, the reductant demand determination circuitry 174a, the compressed gas insertion control circuitry 174b and the pump control circuitry 174c may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the reductant demand determination circuitry 174a, the compressed gas insertion control circuitry 174b and the pump control circuitry 174c may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the reductant demand determination circuitry 174a, the compressed gas insertion control circuitry 174b and the pump control circuitry 174c may also include programmable hardware devices such as field programmable gate arrays, programmable array logic, programmable logic devices or the like. In this regard, reductant demand determination circuitry 174a, the compressed gas insertion control circuitry 174b and the pump control circuitry 174c may include one or more memory devices for storing instructions that are executable by the processor(s) of the reductant demand determination circuitry 174a, the compressed gas insertion control circuitry 174b and the pump control circuitry 174c. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect the reductant demand determination circuitry 174a, the compressed gas insertion control circuitry 174b and the pump control circuitry 174c. Thus, the depicted configuration represents the aforementioned arrangement where the reductant demand determination circuitry 174a, the compressed gas insertion control circuitry 174b and the pump control circuitry 174c are embodied as machine or computer-readable media. However, as mentioned above, this illustration is not meant to be limiting as the present disclosure contemplates other embodiments such as the aforementioned embodiment where the reductant demand determination circuitry 174a, the compressed gas insertion control circuitry 174b and the pump control circuitry 174c, or at least one circuit of the reductant demand determination circuitry 174a, the compressed gas insertion control circuitry 174b and the pump control circuitry 174c are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the reductant demand determination circuitry 174a, the compressed gas insertion control circuitry 174b and the pump control circuitry 174c) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with, for example, the first sensor 103, the second sensor 105, the engine 10, and the reductant insertion system 120 (e.g., the reductant insertion assembly 122 and the compressed gas source 130). The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The reductant demand determination circuitry 174a may be configured to determine whether there is a reductant demand for the reductant or not. For example, the reductant demand determination circuitry 174a may receive a signal from the engine 10 indicative of one or more engine operating parameters (e.g., an intake air volume or flow rate, a fuel/air ratio, and engine speed or torque, etc.) and use the engine operating parameters to determine if there is a reductant demand for the reductant, for example, whether the reductant should be inserted into the SCR system 150, a volume, pressure and/or a flow rate of the reductant to be inserted into the SCR system 150, and/or an insertion timing and/or insertion frequency of reductant to be inserted into the SCR system 150. In other embodiments, the reductant demand determination circuitry 174a may additionally or alternatively be configured to receive a first sensor signal from the first sensor 103 and/or a second sensor signal from the second sensor 105 indicative of, for example, an amount of NOx gases included in the exhaust gas, and exhaust gas flow rate and/or an amount of NOx gases included in the treated exhaust gas expelled from SCR system 150, respectively and determine the reductant demand therefrom.

The compressed gas insertion control circuitry 174b may generate a compressed gas signal configured to selectively activate the compressed gas source 130, and the pump control circuitry 174c may generate a pump signal configured to selectively activate the pump 124 included in the reductant insertion assembly 122. For example, the compressed gas insertion control circuitry 174b may be configured to selectively activate compressed gas source 130 (e.g., open the gas valve 132) and the pump control circuitry 174c may be configured to selectively activate the pump 124 (e.g., start the pump 124 and open the metering valve 126), for example, in response to there being a reductant demand for the reductant. Activating the pump 124 causes the reductant to be pumped into the reductant injector 140. Furthermore, activating the compressed gas source 130 (e.g., opening the gas valve 132) causes the compressed gas source 130 to provide the compressed gas (e.g., compressed air or recirculated exhaust gas) to the reductant injector 140 so as to provide gas assisted delivery of the reductant through the reductant injector 140.

In response to determining that there is no reductant demand, (e.g., when exhaust gas pressure and/or flow rate is low, at engine 10 startup and/or engine 10 OFF conditions) the pump control circuitry 174c may be configured to stop the pump 124, and the compressed gas insertion control circuitry 174b may be configured to activate the compressed gas source 130 for a predetermined time so as to provide compressed gas to the reductant injector 140 (e.g., with the pump 124 being stopped and/or with the metering valve 126 being closed). The compressed gas may have a pressure sufficient to force the reductant contained in the reductant injector 140 upstream towards the reductant insertion assembly 122 via the reductant delivery line 128, therefore purging the reductant injector 140 of the reductant when there is no reductant demand. In some embodiments, the compressed gas may have a compressed gas pressure sufficient to force the reductant contained in the reductant injector 140 upstream into the reductant delivery line 128 such that at least a portion of a length of the reductant delivery line 128 downstream of the reductant insertion assembly 122 remains filled with the reductant. In other embodiments, the compressed gas may have a compressed gas pressure sufficient to force the reductant contained in the reductant injector 140 completely into the reductant insertion assembly 122 through the reductant delivery line 128 such that the reductant delivery line 128 is substantially empty of the reductant.

In some embodiments, in response to the reductant demand being not present, the pump control circuitry 174c may be configured to activate the pump 124 for reverse flow operation so as to draw any reductant contained in the reductant injector 140 upstream towards the reductant insertion assembly 122. For example, the pump 124 may include a fixed displacement gear pump configured for reversible flow operation, for example, forward flow operation configured to pump the reductant towards the reductant injector 140, as well as reverse flow operation configured to draw the reductant from the reductant injector 140 towards the pump 124. In some embodiments, the pump control circuitry 174c may be configured to activate the pump 124 for a first predetermined time such that at least a portion of a length of the reductant delivery line 128 downstream of the reductant insertion assembly 122 remains filled with the reductant, as previously described herein. In some embodiments, the controller 170 may be configured to activate the pump 124 for a second predetermined time such that substantially all of the reductant is drawn from the reductant injector 140 and the reductant delivery line 128 into the pump 124, and the reductant delivery line 128 is substantially empty of the reductant, as previously described herein In other embodiments, the pump control circuitry 174c may also be configured to move the purge valve 129 into an open configuration so as to allow at least a portion of the reductant contained in the reductant return line 127 to be drawn towards the pump 124 as the pump 124 is operating in reverse flow operation. In such embodiments, the pump 124 may be operated any length of time in reverse flow mode (e.g., a predetermined number of revolutions or a fixed displacement) so as to withdraw the reductant contained in the reductant return line 127 such that a portion of the length of the reductant return line 127 contains reductant, or the reductant return line 127 is substantially empty of the reductant.

Figure 4A:
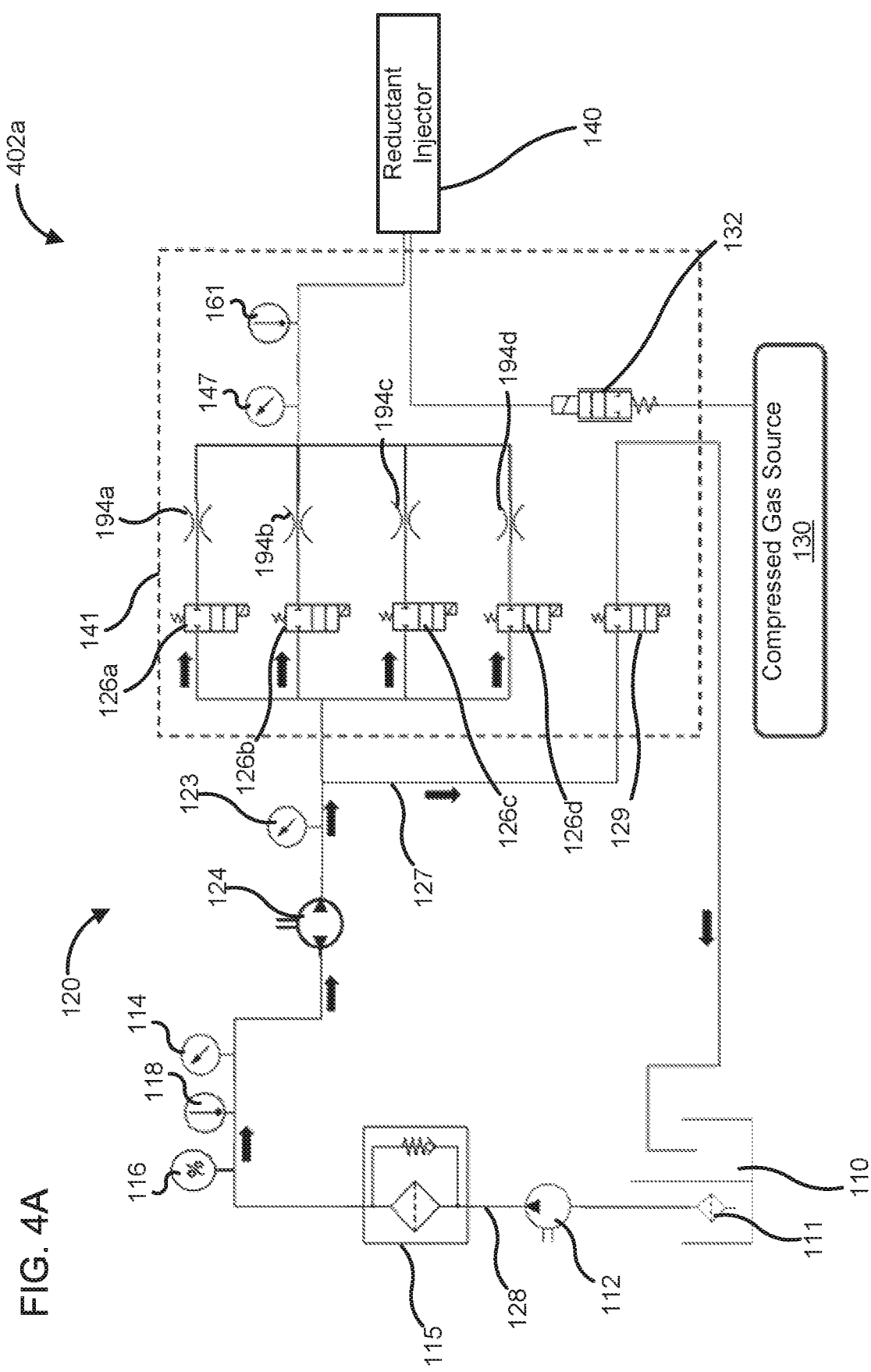
FIG. 4A is a schematic illustration of an example fluidic circuit which may include the reductant insertion system of FIG. 1, according to an embodiment.

FIG. 4A is a schematic illustration of a fluidic circuit 402a for providing reductant to an SCR system of an aftertreatment system (e.g., the SCR system 150 included in the aftertreatment system 100) which includes the reductant insertion system 120, via the reductant injector 140, according to an embodiment. The fluidic circuit 402a includes the reductant storage tank 110 which stores a volume of the reductant (e.g., a diesel exhaust fluid). A tank filter 111 may be positioned in the reductant storage tank 110, for example at an inlet of a reductant delivery line 128 operatively coupled to the reductant storage tank 110. The tank filter 111 may be configured to filter reductant deposits or crystals, or contaminants (e.g., dust, debris, etc.) from the reductant so as to prevent such deposits, crystals or contaminants from entering the reductant delivery line 128.

An upstream pump 112 may be positioned in the reductant delivery line 128 and configured to pump the reductant from the reductant storage tank 110 to the pump 124 positioned downstream thereof. The upstream pump 112 may comprise a lift pump. A reductant filter 115 may be positioned in the reductant delivery line 128 downstream of the upstream pump 112 and the upstream of the pump 124. The reductant filter 115 may be configured to filter reductant deposits or contaminants from the reductant and may also include a bypass circuit, for example to recirculate at least a portion of the reductant therein (e.g., to prevent excessive reductant pressure buildup).

The pump 124 may be positioned downstream of the reductant filter 115. A urea quality sensor 116, a temperature sensor 118, and an upstream pressure sensor 114 may be positioned upstream of the pump 124. The urea quality sensor 116 is configured to measure a percentage of urea in the reductant (e.g., an aqueous urea solution). The temperature sensor 118 may be configured to measure a temperature of the reductant communicated to the pump 124. Furthermore, the upstream pressure sensor 114 may be configured to measure an upstream reductant pressure upstream of the pump 124. The upstream pump 112 may be configured to adjust a pumping pressure thereof based on the upstream reductant pressure, so as to provide the reductant to the pump 124 at a predetermined upstream reductant pressure and/or flow rate (e.g., a rated inlet pressure and/or flow rate of the pump 124).

A downstream pressure sensor 123 may be positioned downstream of the pump 124, and configured to measure a reductant pressure downstream of the pump 124. The pump 124 may be configured to adjust a pumping pressure thereof based on the downstream reductant pressure so as to provide the reductant to a plurality of metering valves 126*a/b/c/d* at a predetermined reductant pressure and/or flow rate. The purge valve 129 is operably coupled to the reductant return line 127. The purge valve 129 is configured to be selective activated to redirect the reductant flow away from a pump outlet of the pump 124 and towards the reductant storage tank 110 via the reductant return line 127, for example to reduce a reductant pressure in the plurality of metering valves 126*a/b/c/d*, as previously described herein.

The pump 124 is operatively coupled to each of the plurality of metering valves 126*a/b/c/d* positioned within a metering manifold 141. A first nozzle 194*a*, a second nozzle 194*b*, a third nozzle 194*c*, and a fourth nozzle 194*d* may be positioned downstream of the first metering valve 126*a*, the second metering valve 126*b*, the third metering valve 126*c* and the fourth metering valve 126*d*, respectively. Each of the nozzles 194*a/b/c/d* may have a predetermined nozzle diameter configured to provide the reductant to the reductant injector 140 at a predetermined pressure and flow rate corresponding to a diameter of the nozzles 194*a/b/c/d*. The nozzle diameter of the each of the nozzles 194*a/b/c/d* may be different from each other (e.g., in a range of 0.1 mm to 1.0 mm), and configured to provide the reductant to the reductant injector 140 (e.g., one or more reductant injectors) at a particular pressure and flow rate based on the operating pressure of the reductant provided by the pump 124 and the corresponding nozzle diameter. In particular embodiments, the first nozzle 194*a* may have a nozzle diameter of 0.7 mm, the second nozzle 194*b* may have a nozzle diameter of 0.5 mm, the third nozzle 194*c* may have a nozzle diameter of 0.3 mm, and the fourth nozzle 194*d* may have a nozzle diameter of 1.0 mm.

A reductant outlet pressure sensor 147 and a reductant outlet temperature sensor 161 may be positioned downstream of the nozzles 194*a/b/c/d*. The reductant outlet pressure sensor 147 may be configured to measure a reductant outlet pressure of the reductant downstream of the nozzles 194*a/b/c/d*. The pump 124 may be configured to adjust a pumping pressure thereof based on the reductant outlet pressure downstream of the nozzles 194*a/b/c/d*, for example to allow delivery of the reductant to the reductant injector 140 at a target pressure and/or target flow rate. Furthermore, the reductant outlet temperature sensor 161 may be configured to measure a temperature of the reductant downstream the reductant nozzles 194*a/b/c/d*.

The compressed gas source 130 is also be coupled to the reductant injector 140, and configured to provide compressed gas (e.g., air or recirculated exhaust gas) for mixing with the reductant and providing gas assisted reductant delivery through the reductant injector 140. The gas valve 132 may be positioned downstream of the compressed gas source 130 and configured to control an amount of gas mixed with the reductant. In some embodiments, an aftertreatment system (e.g., the aftertreatment system 100) including the reductant insertion system 120 may include a turbocharger. In such embodiments, the compressed gas (e.g., air) may be drawn from a turbine of the turbocharger and/or a compressor inlet of a compressor of the turbocharger. The reductant insertion system 120 may also include a mixer or blender configured to mix the gas with the reductant communicated to the insertion unit, so as to provide gas-assisted reductant insertion into the SCR system (e.g., the SCR system 150). In other embodiments, the mixing is performed in a mixing chamber (e.g., the mixing chamber 346) included in the reductant injector 140 (e.g., the reductant injector 340).

Figure 4B:
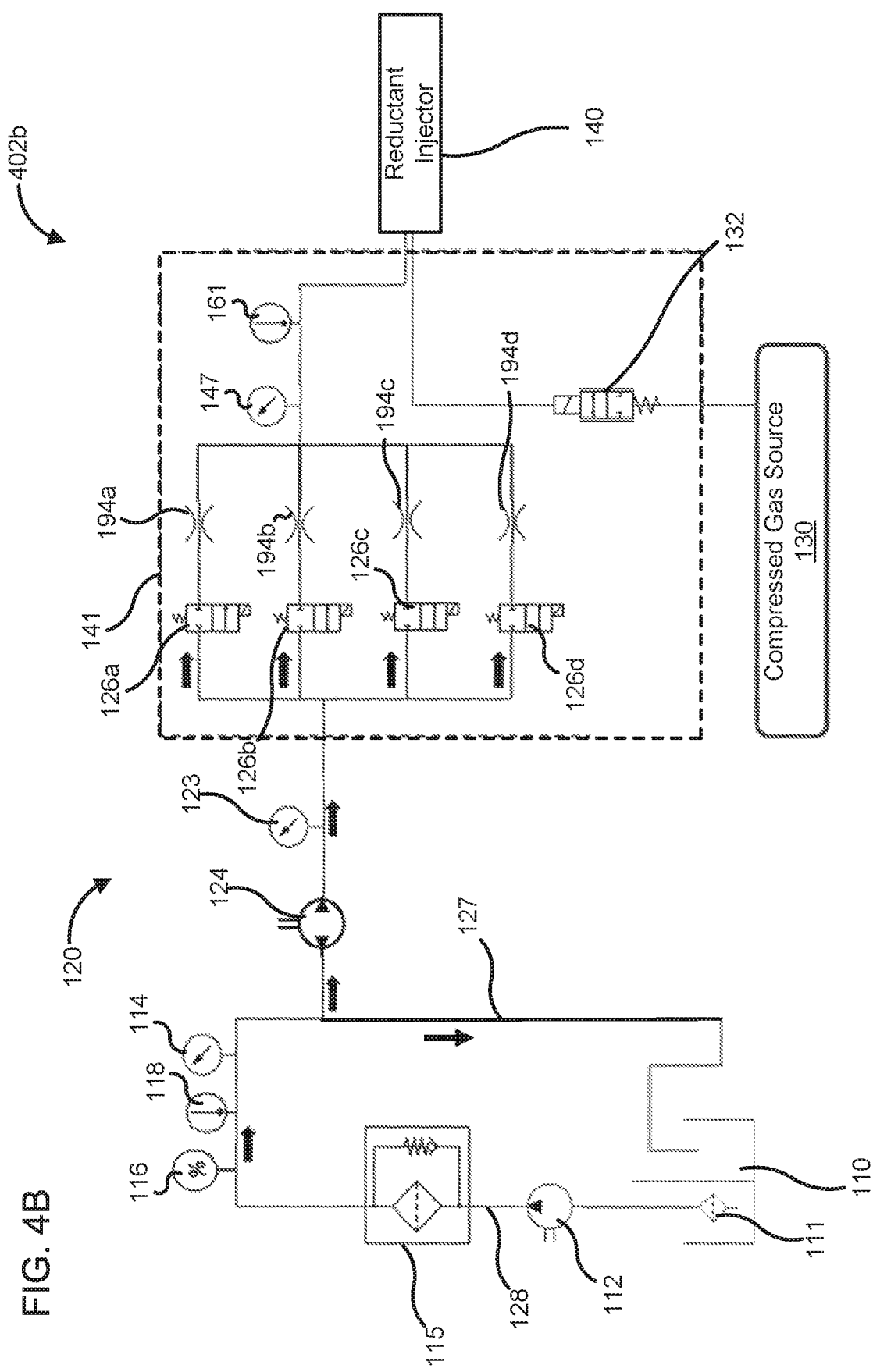
FIG. 4B is a schematic illustration of an example fluidic circuit which may include the reductant insertion system of FIG. 1, according to another embodiment.

FIG. 4B is a schematic illustration of a fluidic circuit 402*b* which may include the reductant insertion system 120, according to another embodiment. The fluidic circuit 402*b* of FIG. 4B is substantially similarly to the fluidic circuit 402*a* of FIG. 4A except for the following differences.

The fluidic circuit 402*b* shown in FIG. 4B does not include the purge valve 129 shown in FIG. 4A. Instead, the reductant return line 127 is operatively coupled to the reductant delivery line 128 upstream of the pump 124. In operation, the upstream pump 112 operates at a constant flow rate which is always greater than a flow rate required by the pump 124 for insertion of the reductant into the reductant injector 140 via any one of the metering valves 126*a/b/c/d*. A reductant first portion of the reductant pumped by the upstream pump 112 through the reductant delivery line 128 is received by the pump 124. The pump 124 pressurizes the reductant first portion and pumps it to the metering valves 126*a/b/c/d* and therefrom, to the reductant injector 140. A reductant second portion of the reductant is returned to the reductant storage tank 110 via the reductant return line 127. Since the reductant second portion is always returned to the reductant storage tank 110, the purge valve 129 can be excluded, thereby reducing complexity while providing protection from over-pressurization of the reductant insertion assembly 122.

FIG. 5 is a schematic flow diagram of an example method 500 for purging a reductant from a reductant injector (e.g., the reductant injector 140) having a reductant insertion assembly (e.g., the reductant insertion assembly 122) and a compressed gas source (e.g., the compressed gas source 130) operatively coupled thereto. While described with respect to the reductant insertion system 120, the operations of the method 500 may be used with any other reductant insertion assemblies described herein.

The method 500 comprises determining whether there is a reductant demand for the reductant, at 502. For example, the reductant demand determination circuitry 174*a* may receive an engine signal from the engine 10 indicative of one or more engine operating parameters (e.g., an intake air volume or flow rate, a fuel/air ratio, and engine speed or torque, etc.) and use the engine operating parameters to determine the reductant demand, for example, whether a reductant has to inserted into the SCR system 150, a volume, pressure and/or a flow rate of the reductant to be inserted into the SCR system 150, and/or an insertion timing and/or insertion frequency of reductant to be inserted into the SCR system 150. In other embodiments, the reductant demand determination circuitry 174a may additionally or alternatively be configured to receive a first sensor signal from the first sensor 103 and/or a second sensor signal from the second sensor 105 indicative of, for example, an amount of NOx gases included in the exhaust gas and/or exhaust gas flow rate, and/or an amount of NOx gases included in the treated exhaust gas expelled from SCR system 150, respectively and determine the reductant demand therefrom.

At 504, the method 500 determines if a reductant demand is present, i.e., whether a reductant has to be inserted into the SCR system at a particular time point. In response to there being a reductant demand for the reductant (504:YES), the pump is activated to pump reductant into the reductant injector, at 506. For example, the pump control circuitry 174c may generate a pump signal configured to selectively activate the pump 124 and the metering valve 126 of the reductant insertion assembly 122 in response to a reductant demand being present. Activating the pump 124 causes the reductant to be pumped into the reductant injector 140. At 508, the compressed gas source is activated to provide gas assisted delivery of the reductant through the reductant injector. For example, the compressed gas insertion control circuitry 174b may generate a compressed gas signal configured to activate the compressed gas source 130 (e.g., open the gas valve 132) to provide compressed gas (e.g., air or recirculated exhaust gas) to the reductant injector 140 for providing gas assisted delivery of the reductant through the reductant injector 140.

If at 504, it is determined that there is no reductant demand (504:NO), the pump is stopped, at 510. For example, the pump control circuitry 174c may instruct the pump 124 to stop. At 512, the compressed gas source is activated for a predetermined time so as to provide compressed gas to the reductant injector. For example, in response to the reductant demand being not present, the compressed gas insertion control circuitry 174b activates the compressed gas source 130 (e.g., opens the gas valve 132), for example, with the pump 124 being inactive (e.g., in an OFF state) and/or the metering valve 126 being closed. The compressed gas may have sufficient pressure to force reductant contained in the reductant injector 140 upstream towards the reductant insertion assembly 122, as previously described herein. In some embodiments, the compressed gas may have a compressed gas pressure sufficient to force the reductant upstream in the reductant delivery line 128 such that at least a portion of a length of the reductant delivery line 128 downstream of the reductant insertion assembly 122 remains filled with the reductant. In other embodiments, the compressed gas may have a compressed gas pressure sufficient to completely force all of the reductant into the reductant insertion assembly 122 through the reductant delivery line 128 such that the reductant delivery line 128 is substantially empty of the reductant.

In some embodiments, the pump (e.g., the pump 124) included in the reductant insertion assembly (e.g., the reductant insertion assembly 122) may include a reversible flow pump (e.g., a fixed displacement gear pump). In such embodiments, the method 500 may additionally or alternately comprise activating the pump for reverse flow operation so as to draw the reductant contained in the reductant injector upstream towards the reductant insertion assembly, at 514. For example, the pump control circuitry 174c may activate the pump 124 for reverse flow operation so as to draw the reductant from the reductant injector 140 towards the pump 124. In some embodiments, the pump 124 may be activated for a first predetermined time such that at least a portion of a length of the reductant delivery line 128 downstream of the reductant insertion assembly 122 remains filled with the reductant, as previously described herein. In other embodiments, the pump 124 may be activated for a second predetermined time such that substantially all of the reductant is drawn from the reductant injector 140 and the reductant delivery line 128 into the pump 124, and the reductant delivery line 128 is substantially empty of the reductant, as previously described herein.

In some embodiments, the method 500 may also include opening a purge valve for a predetermined time, at 516. For example, the pump control circuitry 174c may also be configured to move the purge valve 129 into an open configuration so as to allow at least a portion of the reductant contained in the reductant return line 127 to be drawn towards the pump 124 as the pump 124 is operating in reverse flow operation, as previously described herein.

Figure 6:
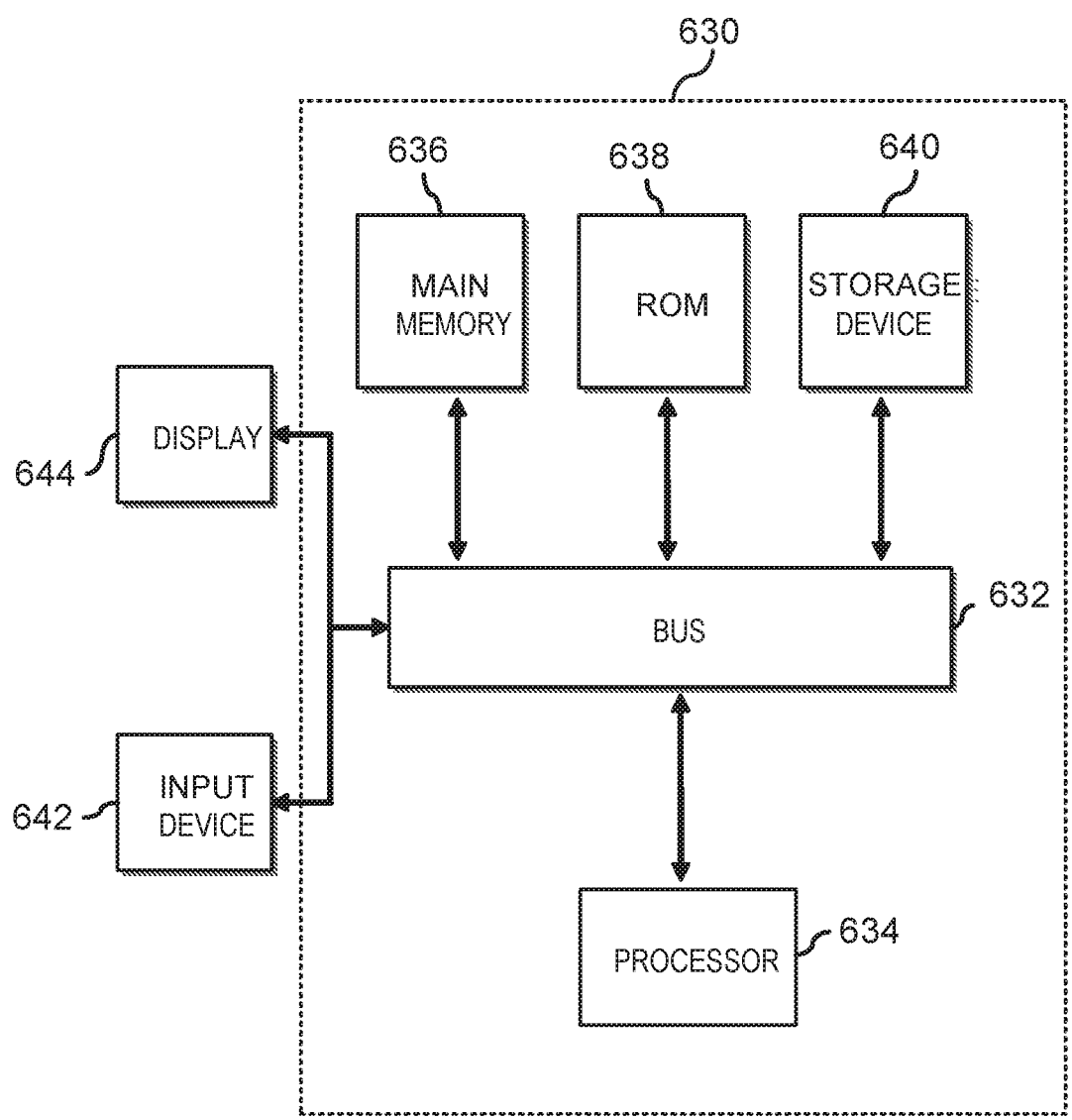
FIG. 6 is a schematic block diagram of an embodiment of a computing device which can be used as the controller of FIG. 1 or FIG. 2.

In some embodiments, the controller 170, the control circuitry 171, the controllers or any of the controllers described herein can be a system computer of an apparatus or system which includes the reductant insertion system 120 (e.g., a vehicle, an engine or generator set, etc.). For example, FIG. 6 is a block diagram of a computing device 630 in accordance with an illustrative implementation. The computing device 630 can be used to perform any of the methods or the processes described herein, for example the method 500. In some embodiments, the controller 170 or the control circuitry 171 can include the computing device 630. The computing device 630 includes a bus 632 or other communication component for communicating information. The computing device 630 can also include one or more processors 634 or processing circuits coupled to the bus for processing information.

The computing device 630 also includes main memory 636, such as a random access memory (RAM) or other dynamic storage device, coupled to the bus 632 for storing information, and instructions to be executed by the processor 634. Main memory 636 can also be used for storing position information, temporary variables, or other intermediate information during execution of instructions by the processor 634. The computing device 630 may further include a read only memory (ROM) 638 or other static storage device coupled to the bus 632 for storing static information and instructions for the processor 634. A storage device 640, such as a solid-state device, magnetic disk or optical disk, is coupled to the bus 640 for persistently storing information and instructions.

The computing device 630 may be coupled via the bus 632 to a display 635, such as a liquid crystal display, or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 500). Such instructions can be read into main memory 636 from another non-transitory computer-readable medium, such as the storage device 640. Execution of the arrangement of instructions contained in main memory 636 causes the computing device 630 to perform the illustrative processes described herein. One or more processors in a multi-processing arrangement may also be employed to execute the instructions contained in main memory 636. In alternative implementations, hardwired circuitry may be used in place of or in combination with software instructions to effect illustrative implementations. Thus, implementations are not limited to any specific combination of hardware circuitry and software.

Although an example computing device has been described in FIG. 6, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the terms "substantially' and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the embodiments as recited in the appended claims.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A reductant insertion system for inserting reductant into an aftertreatment system via a reductant injector, the reductant insertion system comprising:
    a reductant insertion assembly comprising a pump operatively coupled to the reductant injector via a reductant delivery line and configured to pump the reductant to the reductant injector;
    a reductant return line coupled to the reductant delivery line upstream of the pump and to a reductant storage tank;
    a compressed gas source operatively coupled to the reductant injector and configured to provide a compressed gas to the reductant injector for gas assisted delivery of the reductant through the reductant injector; and
    a controller operatively coupled to the compressed gas source and the reductant insertion assembly, the controller configured to:
        determine whether there is a reductant demand for the reductant,
        in response to determining that there is no reductant demand:
            stop the pump, and
            activate the compressed gas source for a predetermined time so as to provide the compressed gas to the reductant injector at a pressure sufficient to force reductant contained in the reductant injector upstream towards the reductant insertion assembly via the reductant delivery line while the pump is stopped so as to return at least a portion of the reductant to the reductant storage tank via the reductant delivery line and/or the reductant return line.

2. The reductant insertion system of claim 1, wherein the pressure is sufficient to force the reductant upstream in the reductant delivery line such that at least a portion of a length of the reductant delivery line downstream of the reductant insertion assembly remains filled with the reductant.

3. The reductant insertion system of claim 1, wherein the pressure is sufficient to force the reductant into the reductant insertion assembly through the reductant delivery line such that the reductant delivery line is substantially empty of the reductant.

4. The reductant insertion system of claim 1, wherein the pump is a reversible flow pump, and wherein the controller is further configured to activate the pump for reverse flow operation in response to determining that there is no reductant demand so as to draw reductant contained in the reductant injector upstream towards the reductant insertion assembly via the reductant delivery line.

5. The reductant insertion system of claim 1, wherein at least a portion of the reductant insertion assembly is positioned at a lower elevation relative to the reductant injector such that the reductant contained in the reductant injector flows upstream towards the reductant insertion assembly under the influence of gravity when the reductant demand is not present.

6. An aftertreatment system for reducing constituents of an exhaust gas produced by an engine, the aftertreatment system comprising:
    a selective catalytic reduction system;
    a reductant injector operatively coupled to the selective catalytic reduction system and configured to insert a reductant into the selective catalytic reduction system; and
    the reductant insertion system of claim 1.

7. A reductant insertion system for inserting a reductant into an aftertreatment system via a reductant injector, the reductant insertion system comprising:
    a reductant insertion assembly operatively coupled to the reductant injector via a reductant delivery line, the reductant insertion assembly comprising a pump; and
    a reductant return line coupled to the reductant delivery line upstream of the pump and to a reductant storage tank;
    a controller operatively coupled to the reductant insertion assembly, the controller configured to:
        determine whether there is a reductant demand for the reductant; and
        in response to determining that there is no reductant demand, activate the pump for reverse flow operation so as to draw reductant contained in the reductant injector upstream towards the reductant insertion assembly via the reductant delivery line and return at least a portion of the reductant to the reductant storage tank via the reductant delivery line and/or the reductant return line.

8. The reductant insertion system of claim 7, wherein the controller is configured to activate the pump for a first predetermined time such that at least a portion of a length of the reductant delivery line downstream of the reductant insertion assembly remains filled with the reductant.

9. The reductant insertion system of claim 7, wherein the controller is configured to activate the pump for a second predetermined time such that substantially all of the reductant is drawn from the reductant injector and the reductant delivery line, and the reductant delivery line is substantially empty of the reductant.

10. The reductant insertion system of claim 7, wherein the reductant insertion system comprises a compressed gas source operatively coupled to the reductant injector and configured to provide a compressed gas to the reductant injector for gas assisted delivery of the reductant through the reductant injector, and wherein the controller is also operatively coupled to the compressed gas source, the controller configured to activate the compressed gas source for a predetermined time in response to determining that there is no reductant demand so as to provide the compressed gas to the reductant injector at a pressure sufficient to force reductant contained in the reductant injector upstream towards the reductant insertion assembly via the reductant delivery line while the pump is activated for reverse flow operation.

11. The reductant insertion system of claim 7, wherein at least a portion of the reductant insertion assembly is positioned at a lower elevation relative to the reductant injector such that the reductant contained in the reductant injector flows upstream towards the reductant insertion assembly under the influence of gravity when there is no reductant demand for the reductant.

12. An aftertreatment system for reducing constituents of an exhaust gas produced by an engine, the aftertreatment system comprising:
  a selective catalytic reduction system;
  a reductant injector operatively coupled to the selective catalytic reduction system and configured to insert a reductant into the selective catalytic reduction system; and
  the reductant insertion system of claim 7.

13. A method for purging a reductant from a reductant injector having a reductant insertion assembly comprising a pump and operatively coupled to the reductant injector via a reductant delivery line, a reductant return line coupled to the reductant delivery line upstream of the pump and to a reductant storage tank, and a compressed gas source operatively coupled to the reductant injector, the method comprising:
  determining whether there is a reductant demand for the reductant;
  in response to the reductant demand being present:
    activating the pump so as to pump the reductant into the reductant injector via the reductant delivery line, and
    activating the compressed gas source so as to provide gas assisted delivery of the reductant through the reductant injector; and
  in response to determining that there is no reductant demand:
    stopping the pump, and
    activating the compressed gas source for a predetermined time so as to provide the compressed gas to the reductant injector at a pressure sufficient to force reductant contained in the reductant injector upstream towards the reductant insertion assembly via the reductant delivery line while the pump is stopped and to return at least a portion of the reductant to the reductant storage tank via the reductant delivery line and/or the reductant return line.

14. The method of claim 13, wherein the pressure is sufficient to force the reductant upstream in the reductant delivery line such that at least a portion of a length of the reductant delivery line downstream of the reductant insertion assembly remains filled with the reductant.

15. The method of claim 13, wherein the pressure is sufficient to force the reductant into the reductant insertion assembly through the reductant delivery line such that the reductant delivery line is substantially empty of the reductant.

16. The method of claim 13, wherein the pump comprises a reversible flow pump, and wherein the method further comprises, in response to there being no reductant demand, activating the pump for reverse flow operation so as to draw the reductant contained in the reductant injector upstream towards the reductant insertion assembly.

17. A method for purging a reductant from a reductant injector having a reductant insertion assembly comprising a pump and operatively coupled to the reductant injector via a reductant delivery line, a reductant return line coupled to the reductant delivery line upstream of the pump and to a reductant storage tank, and a compressed gas source operatively coupled to the reductant injector, the method comprising:
  determining whether there is a reductant demand for the reductant;
  in response to the reductant demand being present:
    activating the pump for forward flow operation so as to pump the reductant into the reductant injector via the reductant delivery line, and
    activating the compressed gas source so as to provide gas assisted delivery of the reductant through the reductant injector; and
  in response to determining that there is no reductant demand, activating the pump for reverse flow operation so as to draw reductant contained in the reductant injector upstream towards the reductant insertion assembly via the reductant delivery line and to return at least a portion of the reductant to the reductant storage tank via the reductant delivery line and/or the reductant return line.

18. The method of claim 17, wherein the pump is activated for a first predetermined time such that at least a portion of a length of the reductant delivery line downstream of the reductant insertion assembly remains filled with the reductant.

19. The method of claim 17, wherein the pump is activated for a second predetermined time such that substantially all of the reductant is drawn from the reductant injector and the reductant delivery line, and the reductant delivery line is substantially empty of the reductant.

20. The method of claim 17, further comprising activating the compressed gas source for a predetermined time in response to determining that there is no reductant demand so as to provide the compressed gas to the reductant injector at a pressure sufficient to force reductant contained in the reductant injector upstream towards the reductant insertion assembly via the reductant delivery line while the pump is activated for reverse flow operation.

* * * * *